United States Patent [19]

McAuliffe et al.

[11] Patent Number: 5,111,389
[45] Date of Patent: May 5, 1992

[54] APERIODIC MAPPING SYSTEM USING POWER-OF-TWO STRIDE ACCESS TO INTERLEAVED DEVICES

[75] Inventors: Keven P. McAuliffe, Yorktown Heights; Evelyn A. Melton, Poughkeepsie; Vern A. Norton, Croton-On-Hudson; Gregoty F. Pfister, Briarcliff Manor; Scott P. Wakefield, Croton-On-Hudson, all of N.Y.

[73] Assignee: International Business Machines Corporation, Armonk, N.Y.

[21] Appl. No.: 114,909

[22] Filed: Oct. 29, 1987

[51] Int. Cl.$^5$ .............................................. G06F 12/10
[52] U.S. Cl. ..................................... 395/800; 364/243; 364/246.4; 364/246.3; 364/256.3; 364/DIG. 1
[58] Field of Search ... 364/200 MS File, 900 MS File, 364/725, 726, 727, 754, 757, 758; 382/43

[56] References Cited

U.S. PATENT DOCUMENTS

| | | | |
|---|---|---|---|
| 3,691,531 | 9/1972 | Saltini et al. | 340/172.5 |
| 3,800,289 | 3/1974 | Batcher | 364/200 |
| 3,812,467 | 5/1974 | Batcher | 364/900 |
| 4,149,242 | 4/1979 | Pirz | 364/200 |
| 4,157,587 | 6/1979 | Joyce et al. | 364/200 |
| 4,167,782 | 9/1979 | Joyce et al. | 364/200 |
| 4,275,268 | 6/1981 | Takahashi et al. | 364/754 X |
| 4,370,732 | 1/1983 | Kogge | 364/900 |
| 4,395,757 | 7/1983 | Bienvenu et al. | 364/200 |
| 4,433,389 | 2/1984 | York et al. | 364/900 |
| 4,484,262 | 11/1984 | Sullivan et al. | 364/200 |
| 4,484,272 | 11/1984 | Green | 364/200 |
| 4,550,367 | 10/1985 | Hattori et al. | 364/200 |
| 4,556,960 | 12/1985 | Cohn et al. | 364/900 |
| 4,587,610 | 5/1986 | Rodman | 364/200 |
| 4,588,985 | 5/1986 | Carter et al. | 340/347 |
| 4,747,070 | 5/1988 | Trottier et al. | 364/900 |

OTHER PUBLICATIONS

IBM Technical Disclosure Bulletin, vol. 24, No. 5, Oct. 1981, pp. 2335-2336, "Electronic Signature for Use with Data Encryption Standard" by Matyas et al.
IBM Technical Disclosure Bulletin, vol. 28, No. 2, Jul. 1985, pp. 603-604, "Matrix Digital Signature for Use with the Data Encryption Algorithm" by Lubold et al.
IBM Technical Disclosure Bulletin, vol. 16, No. 7, Dec. 1973, pp. 2223-2224, "Information Retrieval Technique" by Anglin et al.
IBM Technical Disclosure Bulletin, vol. 24, No. 5, Oct. 1981, pp. 2332-2334, "Electronic Signature for Data Encryption Standard" by Matyas et al.
IBM Technical Disclosure Bulletin, vol. 25, No. 8, Jan. 1983, pp. 4445-4449, "Versatile Programmable Logic Array" by Langmaid.
Pfister et al., "'Hot Spot' Contention and Combining in Multistage Interconnection Networks," Proceedings of the 1985 International Conference on Parallel Processing, pp. 790-797.

(List continued on next page.)

*Primary Examiner*—Thomas C. Lee
*Assistant Examiner*—Larry Donaghue
*Attorney, Agent, or Firm*—Roy R. Schlemmer; Douglas W. Cameron

[57] ABSTRACT

An aperiodic mapping procedure for the mapping of logical to physical addresses is defined as a permutation function for generating optimized stride accesses in an interleaved multiple device system such as a large, parallel processing shared memory system wherein the function comprises a bit-matrix multiplication of a presented first (logical) address with a predetermined matrix to produce a second (physical) address. The permutation function maps the address from a first to a second address space for improved memory performance in such an interleaved memory system. Assuming that the memory has n logical address bits and $2_d$ separately accessible memory devices (where $d \leq n$) and a second address that utilizes $n-d$ bits of the first address as the offset within the referenced device node. The procedure includes performing a bit matrix multiplication between successive roows of the said matrix and bits of the first address to produce successive d bits of the second address.

8 Claims, 8 Drawing Sheets

A SHARED MEMORY PARALLEL PROCESSING SYSTEM

OTHER PUBLICATIONS

Budnik et al., "The Organization and Use of Parallel Memories," IEEE Trans. on Computers, Dec. 1971, pp. 1566–1569.

Batcher et al., "The Multidimensional Access Memory in STARAN," IEEE Trans. on Computers, Feb. 1977, pp. 174–177.

Lawrie et al., "The Prime Memory System for Array Access," IEEE Tran. on Computers, C-31, No. 5, May 1982, pp. 435–442.

Kuck, "ILLIAC IV Software and Application Programming," IEEE Trans. on Computers, vol. C-17, No. 8, Aug. 1968, pp. 758–770.

Lawrie, "Access and Alignment of Data in an Array Processor," IEEE Trans. on Computers, vol. c-24, No. 12, Dec. 1975, pp. 1145–1155.

Frailong et al., "XOR-Schemes: A Flexible Data Organization in Parallel Memories," Proceedings, International Conf. on Parallel Processing, Aug. 1985, pp. 276–283.

Wijshoff et al., "The Structure of Perodic Storage Schemes for Parallel Memories," IEEE Trans. on Computers, vol. C-34, No. 6, Jun. 1985, pp. 501–505.

Shapiro, "Theoretical Limitations on the Efficient Use of Parallel Memories," IEEE Trans. on Computers, vol. C-27, No. 5, May 1978, pp. 421–428.

Stone, "Parallel Processing with the Perfect Shuffle," IEEE Trans. on Computers, vol. C-20, No. 2, Feb. 1971, pp. 153–161.

Lenfant, "Parallel Permutations of Data: A Benes Network Control Algorithm for Frequently Used Permutations," IEEE Trans. on Computers, vol. C-27, No. 7, Jul. 1978, pp. 637–647.

Pfister et al., "The IBM Research Parallel Processor Prototype (RP3): Introduction and Architecture," Proceedings, International Conf. on Parallel Processing, 1985, pp. 764–771.

Brooks, "Performance of the Butterfly Processor-Memory Interconnection in a Vector Environment," Proceedings, International Conf. on Parallel Processing, 1985, pp. 21–24.

Mandelbrot, "The Fractal Geometry of Nature," W. H. Freeman and Company, New York, 1983.

FIG. 5 AN INVERTED BASELINE NETWORK

FIG. 7
CONFLICTS WITH STRAIGHT INTERLEAVING

APERIODIC MAPPING SYSTEM USING POWER-OF-TWO STRIDE ACCESS TO INTERLEAVED DEVICES

CROSS REFERENCES TO RELATED COPENDING APPLICATIONS

Copending U.S. patent application Ser. No. 114,795, filed on the same date as the present invention entitled "A HARDWARE MECHANISM FOR THE DYNAMIC CUSTOMIZATION OF PERMUTATION USING BIT-MATRIX MULTIPLICATION" of E. Melton et al, now abandoned and assigned to the same assignee as the present invention, discloses a permutation mechanism that increases memory or device bandwidth by allowing flexibility in customizing a bit-matrix multiply permutation function in hardware for a specific operating environment without requiring any changes to the physical hardware.

The type of bit-matrix multiply permutation function is the same as that generally disclosed in the present invention. In addition, the development of other customized matrices is also described. The hardware of this application allows the different matrices to be readily transferred into the matrix storage medium whereby the resulting permutation mechanism is customized for a particular application whether the CUSTOMIZATION is required by the data access behaviors of the application, or by other critical operating requirements.

Copending U.S. patent application Ser. No. 114,907, filed on the same date as the present application entitled "METHOD AND HARDWARE FOR THE RANDOMIZATION OF CACHE ACCESSES" of E. Melton et al, now abandoned and assigned to the same assignee as the present invention describes a method and apparatus for improving cache memory performance by improving the cache hit ratio.

An address permutation technique is utilized which equally distributes the cache accesses across all of the congruence classes of the set associative cache of a single CPU. The permutation technique utilized involves a bit-matrix multiplication of the n significant bits in a memory reference B with an n×n square matrix to produce a permuted memory reference B' and utilizing the k least significant bits in B' as a key for a congruence class in cache and the remaining n−k most significant bits as an identifier to compare with the line identifiers currently resident in that congruence class. By suitably designing the matrix, periodicity is eliminated from all address strides having a power-of-two. Other matrices may also be designed and used that eliminate periodicities of other strides. The actual bit-matrix multiplication permutation technique is essentially the same as that set forth and described herein. However, as will be apparent to those skilled in the art it is resident in a different architectural environment.

U.S. patent application Ser. No. 664,131, filed Oct. 24, 1984, now U.S. Pat. No. 4,754,394, of Brantley et al, assigned to the same assignee as the present invention, entitled "DYNAMICALLY ALLOCATED LOCAL/GLOBAL STORAGE SYSTEM", discloses a highly parallel processing system having a large interleaved shared memory system wherein the individual memory modules are distributed among the various processors. An interconnection network is provided together with a suitable memory management means so that any processor can readily access any memory module in the system. Further, the system architecture allows concurrent accesses to all the modules, providing of course, that no conflicts exist, such as when more than one processor wants to gain access to a particular memory module. The present memory transformation procedure which is designed to avoid or minimize such conflicts would have particular utility in the memory management facility of such a memory system.

FIELD OF THE INVENTION

The present invention relates generally to the field of multiple resource management in an electronic data processing system. More particularly, it relates to the effective utilization of all such resources at any one instant in time during data processing. Still more particularly, it relates to the one-to-one mapping of logical to physical addresses in, for example, a large shared interleaved memory system in a highly parallel processing environment.

BACKGROUND OF THE INVENTION

In many modern high-performance computer systems, increased bandwidth to memory and I/O devices is obtained by the use of multiple interleaved devices. Interleaving is a way of permitting many accesses to occur at about the same time. Consider $n=2^d$ devices, $D_0, D_2, \ldots D_{n-1}$. Using interleaving, the contents of address m is stored in $D_q$, where $q=\mod(m,n)$. By interleaving in this fashion, up to n references can be satisfied at the same time, particularly if those references are to nearby memory addresses. This will have substantial benefit in highly parallel shared memory systems if many processors are simultaneously working on consecutive addresses. Problems occur in this situation if the addresses are not consecutive, but occur with a stride t such that t and n have a common factor i.e., $\gcd(t,n)>1$. Consider for example the sequence of addresses of stride kn (where k<1, and k $\epsilon$I) given by $a, a+kn, a+2kn, a+3kn, \ldots, a+(n-1)kn$, for some starting address a. If the interleaving above is used, all of these references will be addressed to the same device $D_{\mod(a,n)}$. Such stride accesses occur frequently in application programs, for example in accesses to rows or columns of arrays. The performance impairment that results from such stride accesses becomes worse with very large numbers of processors, and can be a major serialization in such hardware.

In the following discussion references are made to prior art publications via brackets [] in the conventional manner. A list of these publications immediately follows this section.

The problem of nonuniformity of memory access is a serious problem in highly parallel systems, because such memory "hot spots" can result in "tree-blockage" [1]: Network as well as memory contention can limit the performance of the entire system to a rate determined by the device in contention. Such systems are particularly vulnerable to power-of-two stride access contention, because these references are usually interleaved among the devices and routed through the interconnection network by fields in the binary representation of their physical addresses.

In an SIMD parallel system, such as the ILLIAC IV [2] memory access conflicts can cause all processors to wait for the last memory access in a parallel operation. For that reason much effort has been devoted to schemes for eliminating or reducing contention associated with stride access.

Memory organizations which allow conflict free access to any row, column, forward diagonal, and backward diagonal of an application's matrix array have been explored for the ILLIAC IV [2], the STARAN [3], and the BSP [4] computers. In most of these papers, arrays are accessed in a deterministic, conflict-free manner for a synchronized SIMD machine.

In [2], Budnik and Kuck, and [4], Lawrie and Vora proposed hardware and software solutions that require a prime number of memory modules. In [6] Lawrie proposed a system with M memory modules where $M=2N$, where N is the number of processing nodes. All of these solutions are intended to cause M and the stride access to be relatively prime. Batcher [3], and Frailong, Jalby, and Lenfant [7] used skewing schemes that perform XOR operations on indices of an array to map to individual memory units. Wijshoff and Leeuwen in [8] and Shapiro in [9] investigated the mathematical and theoretical limitations to these skewing schemes.

Alignment networks were further studied by Lawrie [6] to provide an alternative solution based on Stone's [10] shuffle-exchange operation to that of building expensive $N \times M$ crossbar switches for the access and storage of properly aligned data. Others, such as Lenfant [11] designed matrices of control patterns for an interconnection network that allows the dynamic permutation of data.

There are several major drawbacks to these schemes. Since they were primarily designed for special purposes, and have built-in dependence on array size and the number of memory modules, they are not suitable for general purpose computing environments that must satisfy more varied constraints. In addition, some of these designs required expensive and complicated addressing and alignment hardware for modulo operations and integer division. Finally, under-utilization of memory can result from "holes" in the address space created by these methods.

REFERENCES

[1] Pfister, G. F., Norton, V. A., "Hot Spot Contention and Combining in Multistage Interconnection Networks," *IEEE Trans on Comp*, C-34, No.10, October 1985, pp. 943-948.

[2] Budnik, P., Kuck, D. J., "The Organization and Use of Parallel Memories," *IEEE Trans on Computers*, December 1971, pp. 1566-1569.

[3] Batcher, K. E., "The Multidimensional Access Memory in STARAN," *IEEE Trans on Comp*, Febuary 1977, pp. 174-177.

[4] Lawrie, D. H., and Vora, C. R., "The Prime Memory System for Array Access," *IEEE Trans on Comp*, C-31, No.5, May, 1982, pp.435-442.

[5] Kuck, D. J., "ILLIAC IV Software and Application Programming," IEEE Trans on Comp, vol.C-17, August 1968, pp.758-770.

[6] Lawrie, D. H., "Access and Alignment of Data in an Array Processor," *IEEE Trans on Comp*, vol. C-24, No. 12, December, 1975, pp. 1145-1150.

[7] Frailong, J. M., Lenfant, J., "XOR-Schemes: A Flexible Data Organization in Parallel Memories," *Proceedings, Internat Conf on Parallel Processing*, August, 1985, pp. 276-283.

[8] Wijshoff, H. A., Leeuwen, J., "The Structure of Periodic Storage Schemes for Parallel Memories," *IEEE Trans on Comp*, Vol. C-34, No. 6, June, 1985, pp. 501-505.

[9] Shapiro, H. D., "Theoretical Limitations on the Efficient Use of Parallel Memories," *IEEE Trans on Comp*, Vol. C-27, No. 5, May, 1978, pp. 421-428.

[10] Stone, H. S., "Parallel Processing with the Perfect Shuffle," *IEEE Trans Comp*, Vol. C-20, February, 1971, pp. 153-161.

[11] Lenfant, J., "Parallel Permutations of Data: A Benes Network Control Algorithm for Frequently Used Permutations," *IEEE Trans on Comp*, Vol. C-27, No. 7, July, 1978, pp. 637-647.

[12] Pfister, G. F., Brantley, W. C., George, D. A., Harvey, S. L., Kleinfelder, W. J., McAuliffe, K. P., Melton, E. A., Norton, V. A., and Weiss, J., "The IBM Research Parallel Processor Prototype (RP3): Introduction and Architecture," *Proceedings, Internat Conf on Parallel Processing*, 1985, pp. 764-771.

[13] Brooks, E. D., "Performance of the Butterfly Processor-Memory Interconnection in a Vector Environment," *Proceedings, Internat Conf on Parallel Processing*, 1985, pp. 21-25.

[14] Mandelbrot, B. B., "The Fractal Geometry of Nature," W. H. Freeman and Company, N.Y., 1983.

Description of the Prior Art

In addition to the publications referenced above, the following represents a discussion of additional art known to the inventors which are considered relevant to but not anticipatory of the present invention.

U.S. Pat. No. 4,484,262 of Sullivan et al discloses a memory manager in the form of a random number generator to "scramble" addresses going to all its associated memory modules. This memory manager may be implemented either as one central procedure or as a hierarchy of procedures. In the latter case when the procedure is distributed in the system some form of coordination must be possible to keep different logical addresses from resolving to the same physical address. It requires a substantial amount of hardware and overhead (the latter in the form of increased packet size through their network memory manager) to be implemented in a computer system. It is a very costly solution for increasing the memory bandwidth for highly parallel systems. When one changes the system configuration and the number of sources and memory units for a highly parallel computer system, the hardware proposed in this patent would require a complete rebuild in order to rescale.

The underlying address transformation mechanism of the present invention is designed to provide a permutation of addresses to parallel devices. The characteristic of such a matrix guarantees that different logical addresses will not resolve to the same physical address. In addition, the present invention is specifically designed to solve power-of-two stride accesses where data may otherwise be grouped in subsets of the total available memory modules using other methods of hashing or randomization.

In an article by R. N. Langmaid entitled "Versatile Programmable Logic Array" appearing in the *IBM Technical Disclosure Bulletin*, Volume 25, Number 8, January 1983, pp. 4445-4449 a logic array or matrix is disclosed which, it is stated, can be used for hashing (see page 4448). However, there is no suggestion as to how it would be used in a parallel processing computer system having a large shared interleaved memory organization.

A number of additional references are known to the inventors but are considered of a background nature only. The majority of them disclose virtual memory systems utilizing hashing in their address translation function. These U.S. Pat. reference numbers are listed below:

| | |
|---|---|
| 3,691,531 | 4,433,389 |
| 4,157,587 | 4,484,272 |
| 4,167,782 | 4,550,367 |
| 4,249,242 | 4,587,610 |
| 4,395,757 | 4,588,985 |

The following references generally disclose some form of multiplication or logic matrix but neither disclose nor suggest bit-matrix multiplication or the application of same to memory mapping procedures.

1. *IBM Technical Disclosure Bulletin*, Matyas et al, Volume 24, Number 5, October 1981, pp. 2335-2336, entitled "Electronic Signature for Use with Data Encryption Standard".
2. *IBM Technical Disclosure Bulletin*, Lubold et al, Volume 28, Number 2, July 1985, pp. 603-604 entitled "Matrix Digital Signature For Use with the Data Encryption Algorithm".
3. *IBM Technical Disclosure Bulletin*, Anglin et al, Volume 16, Number 7, December 1973, pp. 2223-2234 entitled "Information Retrieval Technique".
4. *IBM Technical Disclosure Bulletin*, Matyas et al, Volume 24, Number 5, October 1981, pp. 2232-2234 entitled "Electronic Signature for Data Encryption Standard".

Summary and Objects of the Invention

It is a primary object of the present invention to provide an aperiodic mapping procedure for improving memory bandwidth in power-of-two stride accesses for interleaving shared memory of highly parallel processing systems.

It is a further object of the invention to provide such a procedure having utility in any computing system with a large number of random access interleaved devices. A plurality of such concurrently accessible servers include I/O devices such as large DASD systems, random access memory modules of a SIMD or MIMD highly parallel processing system, and in fact all randomly accessible hierarchical primary and/or secondary memory systems are applicable.

It is a further object of the invention to provide such a procedure wherein a logical address presented to each memory management system is permuted to a physical address having a global effect that the utilization of individual memory modules is highly optimized across the system at any one time, and in particular for logical addresses that have stride accesses of powers-of-two.

It is yet another object of the present invention to provide such a procedure wherein the permutation involves a bit-matrix multiplication of a logical address with a given matrix to produce a unique physical address.

It is a further object of the invention to provide such a procedure wherein the matrix utilized in the permutation procedure possesses the characteristics wherein all square sub-matrices making up the matrix which abut on either the top or the right side of the matrix are invertible or nonsingular.

It is a further object of the present invention to provide such a procedure having particular applicability in a highly parallel processing system with a shared interleaved memory.

It is another object of the invention to provide such a procedure wherein the highly parallel processing system is further characterized in that there are as many processors as interleaved memory modules and wherein the number of the same is a power-of-two.

The objects of the present invention are accomplished in general by a method for mapping logical to physical device addresses including a family of address permutation methods or procedures for decreasing contention associated with stride accesses to interleaved devices. These methods allow uniform accesses for any power-of-two strides, but do not cause contention problems for other stride accesses. They are based on transformations that are linear over the Boolean field GF(2).

This method is applicable to primary and/or secondary memory systems of SIMD or MIMD machines, and can eliminate memory hot-spot problems associated with the stride access pattern of an application. The procedure described herein can easily be implemented in hardware or software and a method is described for incorporating such transformations in a memory mapping unit of a highly parallel processing system. While the present invention has primary utility in large random access interleaved memory systems, it would also be applicable to large I/O systems such as direct access storage devices that require fast data retrieval for database applications.

Description of the Preferred Embodiment

The method proposed here overcomes many of the disadvantages of prior art memory management systems which employ known hashing techniques to achieve improved address distribution especially in large interleaved systems where power-of-two stride accesses are frequently encountered. The present method permutes an address space by applying a Boolean (or binary) matrix multiplication. It will be clearly demonstrated that matrices can be chosen so as to eliminate power-of-two stride access contention in systems where the number of devices is a power-of-two. Such mapping can, for example, be used to eliminate contention associated with memory access in parallel radix two fast Fourier transforms. Though this technique applies specially to eliminate network and memory contention problems for all powers-of-two stride accesses, it does not cause problems in excessive contention for all other non-power-of-two stride accesses.

The benefit in performance will be greatest in synchronous systems, such as SIMD machines, where the method can completely eliminate all power-of-two row and column access contention in what would have been a serial bottleneck. In asynchronous MIMD systems, or in I/O accesses, the improvement can be less dramatic, but sufficient to eliminate stride access as a performance detriment.

The method described can be efficiently implemented in hardware, and is appropriate to be included in the memory mapping or addressing hardware of the individual processors in a parallel system. Such hardware is included in the RP3 design [12] as will be described in a later section. It is advantageous to include such hardware in the design of processing elements for a multiprocessor environment as a system function of the page translation mechanism.

The general method of obtaining improved power-of-two stride access will first be described. An algebraic condition is derived and shown to be sufficient for eliminating power-of-two stride access conflicts to memory. A variant of this condition is shown to be sufficient for eliminating network conflicts as well. Procedures are given for the construction of bit-matrices satisfying the specified conditions. Performance analysis results are presented for one such matrix, showing the access conflicts associated with various strides. Finally, it will be shown how the method can be incorporated as part of the hardware address translation mechanism embodied in either hardware or software in a large shared interleaved memory system such as the experimental RP3 system referenced previously.

A Boolean $r \times s$ matrix is a rectangular array of binary bits, arranged in r rows and s columns. Such matrices describe linear mappings from the vector space $F^s$ of s-tuples of bits to the space of $F^r$ of r-tuples of bits. These are vector spaces over the field $F=GF(2)$ of two elements, $\{0,1\}$. Note that the addition and multiplication in that field are respectively the logical (Boolean) operations of "exclusive-OR" and "AND".

The linear transformation of multiplying a Boolean matrix $M=(m_{ij})$ times a Boolean $s \times 1$ vector V is accomplished in the same manner as one multiplies matrices of integers: The ith element of the product MV is the "dot" product of the ith row of M with the vector V. This dot product is the sum (exclusive-or) of the s bits obtained by multiplying (ANDing) each entry $m_{ij}$ with $v_j$.

The method described herein relies on using the Boolean matrix multiply to apply a permutation to an address space. If the matrix M is a square invertible $s \times s$ matrix, multiplication by M defines a permutation on s-tuples of bits. By regarding s-bit addresses as s-vectors we thereby define a permutation mapping on a space of $2^s$ addresses.

For most of this discussion these addresses will be regarded as memory addresses, and the matrix multiplication will be employed in logical-to-physical address mapping. However, these same methods apply to addressing various other physical devices such as direct access storage media or high speed random access disk drives.

For the sake of definiteness, a system with $2^d$ physical devices will be assumed. Physical addresses in this system consist of s bits (where $d<s$). The first d bits identify the device number, and the last $s-d$ bits identify the different addresses within a device. A logical address is defined as an $s \times 1$ vector. The least significant bit of an address is the last ("bottom") element in the bit-string, and the most significant bit is the first ("top") element in the bit-string.

The algebraic constraints that determine the effect of a matrix on a given power-of-two stride will be described now. Conflict-free access with stride $2^t$ is desired, for some integer $t \geq 0$, across the $2^d$ physical devices. Optimally, consecutive references should go to different devices, with no device being referenced twice until each of the $2^d$ devices are referenced once. This implies that the $2^d$ addresses $0, 2^t, 2 \times 2^t, 3 \times 2^t, \ldots, (2^d-1) \times 2^t$ must all map to distinct physical devices.

The sequence of addresses described above forms a linear subspace S of the address space, if the logical address space is considered to be a Boolean vector space $F^s$ over the field F. In order for this space be mapped uniformly across the physical memory devices, the first d rows of the matrix M are considered, because these rows determine the physical device associated with a logical address. Let M' be the $d \times s$ matrix consisting of the first d rows of M.

The mapping of the subspace S to physical devices is determined by the $d \times d$ submatrix of M', consisting of d adjacent columns of M', columns $s-t-d+1, s-t-d+2, \ldots, s-t$ for a stride of $2^t$. If that submatrix has maximal rank (rank=d), then the subspace S will map to $2^d$ distinct devices. Otherwise, S will be mapped to a smaller subspace of $F^d$, mapping to $2^k$ memory modules, for $k \leq d-1$.

If various power-of-two strides $2^t$, $t=0, 1, 2, \ldots$ are considered, the following condition, is required to cause such stride access to uniformly access the $2^d$ devices:

(A) All $d \times d$ submatrices consisting of d consecutive columns of M' are nonsingular, wherein a matrix is defined as nonsingular if and only if its determinant is nonzero or the matrix is invertible.

A matrix is defined as nonsingular if and only if its determinant is nonzero or the matrix is invertible.

It is noted that condition (A) was derived from considering just the $2^d$ consecutive power-of-two stride accesses starting at address 0. It does not imply uniform access from other starting addresses. However, if the $2^d$ accesses start at another address a, the effect is almost as good: the $2^d$ accesses will not reference any one device more than twice. Note that the mapping M is conflict-free not only on S, but also on any cosets $a \oplus S$ of S. If a stride access that begins at $a \neq 0$, then it will intersect at most 2 such cosets, namely $a \oplus S$ and $(a+2^{i+d}) \oplus S$, $\oplus$ represents the logical bitwise XOR operation.

For an example of a matrix satisfying condition (A), see Table 1.

TABLE I

| A 4 × 8 Matrix satisfying condition (A). |
| --- |
| 1 1 1 1 1 0 0 0 |
| 0 1 0 1 0 1 0 0 |
| 0 0 1 1 0 0 1 0 |
| 0 0 0 1 0 0 0 1 |

The above condition (A) implies reduced memory contention under power-of-two stride access. In many parallel systems, it is also possible to encounter contention going between processors and memory. Consider for example the inverted baseline network pictured in FIG. 5. For a processor to reference a memory module, it must transmit a message through the network to the specified module. Even if two messages are headed to different destinations, they may "collide" at a switch enroute to their destinations. Such conflicts can also be eliminated or reduced by the appropriate choice of an address transformation matrix.

Figure 5:
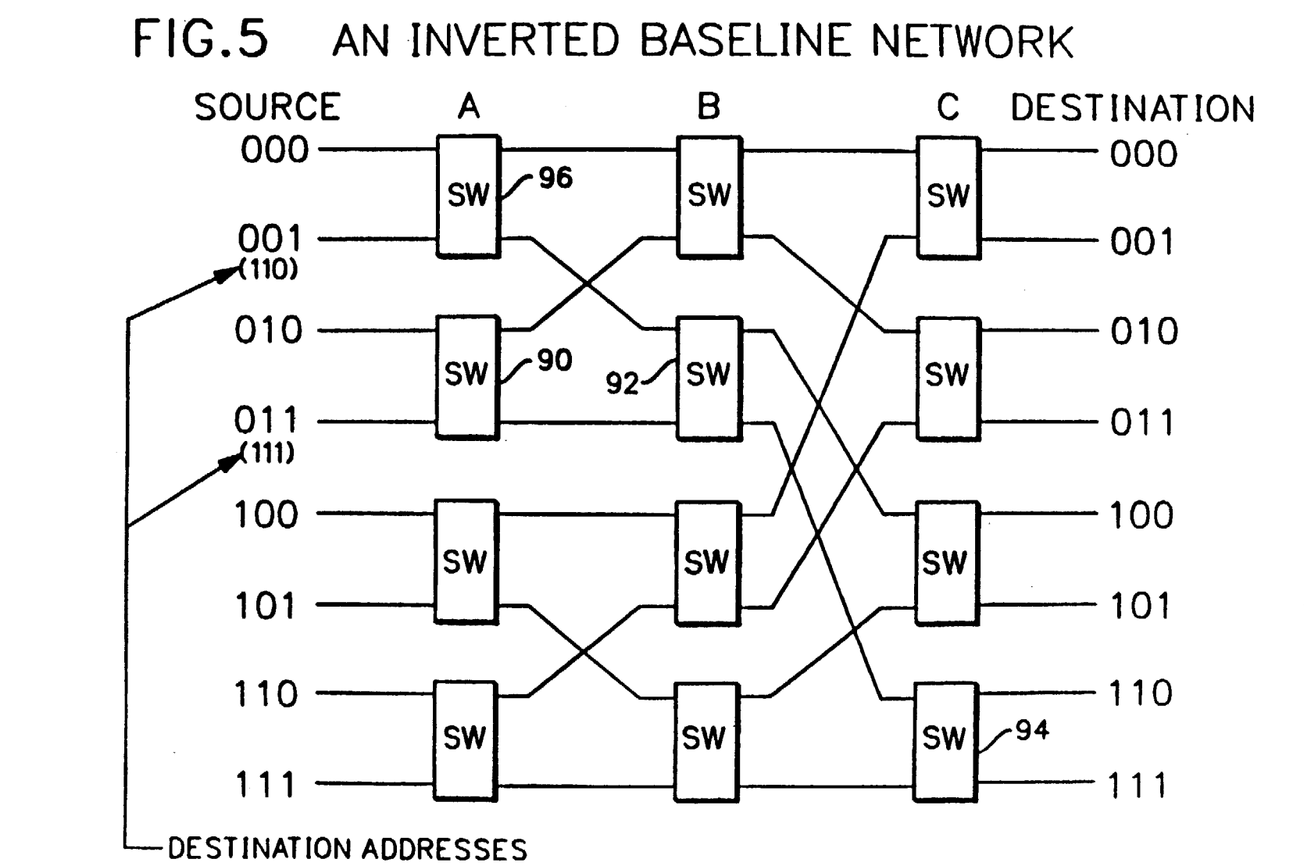
FIG. 5 comprises a functional block diagram of an inverted baseline network such as might be used as the multistage interconnection network in the parallel processing shared memory system of FIG. 1, the use of which clearly illustrates the advantages of the present invention.

An inverted baseline network, as illustrated in FIG. 5 is utilized to show how an appropriate matrix can be chosen; other networks can employ similarly chosen matrices. Note that the unique path from a processor to memory is given by a set of binary choices made at the various switches enroute. Furthermore, the bits used in that routing depend only on the destination memory module, not the originating processor, even though routing paths may be different.

If power-of-two stride access conflicts are to be eliminated in the network, it suffices to ensure that the various routes to memory are uniformly accessed. To do this, the various memory modules are numbered according to the route by which they are accessed: The first (most significant) bit is the routing bit for the first network stage; the second bit being the routing bit for the second stage; etc. This results in the numbering indicated in FIG. 5. According to the physical addressing scheme being used, these are also the most significant bits of the physical addresses of storage locations.

Now suppose that condition (A) is satisfied, not only for every $2^d$ square submatrix of M', but also for submatrices of size $2^j$, for all $j \leq d$. In other words, (B) Every square submatrix of M' that abuts on the top of M' is nonsingular. This condition (B) then implies that any power-of-two stride access, starting at any address a, such that $S \wedge a = 0$ will result in uniform accesses to any of the subspaces of the physical address space defined by the first j bits of the address, wherein $\wedge$ represents the logical bitwise AND operation. For an example of a matrix satisfying condition (B), see Table 2.

TABLE 2

| A 9 × 29 Matrix satisfying condition (B). |
| --- |
| 1 1 1 1 1 1 1 1 1 1 1 1 1 1 1 1 1 1 1 1 1 1 1 1 1 1 1 1 1 |
| 1 0 1 0 1 0 1 0 1 0 1 0 1 0 1 0 1 0 1 0 1 0 1 0 1 0 1 0 1 |
| 1 0 0 1 1 0 0 1 1 0 0 1 1 0 0 1 1 0 0 1 1 0 0 1 1 0 0 1 1 |
| 1 0 0 0 1 0 0 0 1 0 0 0 1 0 0 0 1 0 0 0 1 0 0 0 1 0 0 0 1 |
| 0 1 1 1 1 0 0 0 0 1 1 1 1 0 0 0 0 1 1 1 1 0 0 0 0 1 1 1 1 |
| 0 0 1 0 1 0 0 0 0 1 0 1 0 0 0 0 0 1 0 1 0 0 0 0 0 1 0 1 |
| 0 0 0 1 1 0 0 0 0 0 0 1 1 0 0 0 0 0 0 1 1 0 0 0 0 0 0 0 1 |
| 0 0 0 0 1 0 0 0 0 0 0 0 1 0 0 0 0 0 0 0 1 0 0 0 0 0 0 0 1 |
| 0 0 0 0 0 1 1 1 1 1 1 1 1 0 0 0 0 0 0 0 0 1 1 1 1 1 1 1 1 |

This fact will be used to show that if all processors simultaneously access consecutive elements at the same stride (processor no. i accesses datum $i \times 2^l$) then there will be no conflicts in the network or at memory.

It is still assumed that $2^d$ memory modules are accessed by an inverted baseline network of d stages of two-by-two switches.

Consider any switch in the first stage of the network. The outputs from that switch are addressed by the most significant bit of the address. Because condition (A) is satisfied for the first row of the matrix, it is concluded that the two references in that switch, addressed to data items $i \times 2^l$ and $(i+1) \times 2^l$ must necessarily differ in that bit.

Similarly in stage k of the network, assume that $2^d$ messages arrive simultaneously at the input ports of the various switches in stage k. Consider the first $2^k$ switches of that stage. Because condition (B) applies to row k (for $k \leq d$) of the matrix, it will be seen that the $2^k$ references arriving at that row must necessarily be routed to different output ports without contention. A similar argument applies to subsequent groups of $2^k$ switches in row k. It may be concluded that the entire $2^d$ references will pass through the network with no conflicts.

Even if the stride access to the network is not perfectly synchronized (as was assumed in the above proof) there may be substantial benefit in this method. It has been observed [13] that slight synchronization errors in stride-one vector access will be corrected by the contention delays in such networks. It is expected that a similar benefit will occur in power-of-two stride access, using a matrix memory mapping that satisfies (B).

The criteria (A) and (B) described previously for determining appropriate Boolean matrices are very important since they provide the characteristics of such matrices. A general procedure will now be described for constructing all matrices satisfying (B).

Theorem: Given a matrix of d rows and s columns, there exists a matrix M that satisfies condition (B). In fact, given any choice of subdiagonal bits $\{m_{ij} | i > j\}$, there is a unique Boolean matrix M having those subdiagonal elements and satisfying (B).

Proof: To obtain matrices satisfying (B), reason inductively on the rows of the matrix. Once the first k rows, $1 \leq k \leq s-1$ have been chosen so as to satisfy (B), any choice of the remaining $s-k$ rows that results in an invertible matrix M can be used. Applying condition (B) to the first row implies that every element in that row must be 1, since the elements of that row are just the $1 \times 1$ submatrices.

Assume now that the first $k-1$ rows have been chosen, and that all $(k-1) \times (k-1)$ square submatrices, formed by adjacent columns of the resulting $(k-1) \times s$ matrix are invertible. Choose any $k-1$ values (0 or 1) for the first $k-1$ entries in row k. There is a value (either 0 or 1) for the element $m_{kk}$ such that the resulting $k \times k$ corner submatrix is nonsingular. To prove this, expand the determinant D for that submatrix along its bottom row. The following is obtained:

$$D = m_{k1}D_{k1} + m_{k2}D_{k2} + \ldots + m_{kk}D_{kk}$$

Where, in the above expression, $D_{ij}$ represents the cofactor of the element $m_{ij}$.

Note that by inductive hypothesis the determinant $D_{kk}$ is nonzero, hence 1. It is now possible to choose $m_{kk}$. If the first $k-1$ terms add to zero, $m_{kk}$ is chosen to be 1; otherwise choose $m_{kk}$ to be zero. In either case the square corner submatrix can be chosen to be nonsingular.

Proceeding along row k, the same argument can be applied always choosing $m_{kl}$, $1 > k$, so that the square submatrix having $m_{kl}$ in its lower right-hand corner is invertible. This completes the proof.

The above argument yields a construction of all matrices M satisfying condition (B). For each row k of matrix M it is possible to choose the first $k-1$ bits, and the remaining entries in that row are determined. There are precisely $2^{(d-1)d/2}$ matrices M, of d rows, satisfying (B).

One of these matrices that exhibits a symmetric pattern is illustrated in Table 2. Note how the one's in this matrix form a recursive pattern of repeating triangles; this fractal design is known as the "Sierpinsky gasket" [14]. In hindsight, it is possible to see an easier procedure for generating this matrix: Every element is the exclusive-or of its neighbors to the right and above. This arrangement of bits is the binary equivalent of Pascal's triangle.

When the conditions (A) and (B) are satisfied, conflict-free access is guaranteed when the memory is accessed in power-of-two strides. Other strides are also important, and it would be desirable to have the same elimination of conflict for such strides as well. However, it is not possible to eliminate all stride access conflicts.

If this system is to be of use in general purpose computer systems, it is important that no stride access produces a memory hot spot; or at least that memory contention problems resulting from stride access are extremely infrequent.

To deal with this problem some measures are defined of how well a given permutation deals with various stride accesses. Let M be a $d \times s$ matrix mapping of an s-bit address space, $F^s$, and assume a system of d devices. Thus M is a mapping from the set $F^s$ to the set $\{0, 1, 2, \ldots, d-1\}$. Let t and a be integers, where t is defined to be a stride, and a to be a starting address of the stride.

Consider the addresses in the stride, namely the set A consisting of $a, a+t, a+2t, \ldots, a+(d-1)t$. $C_i$ is defined to be the subset of V mapped to device i by M. I.e., $$C_i = \{X \epsilon V | M(x) = i\}$$

The nonuniformity of M with respect to (a,t) is defined to be the number of elements in the largest of the $C_i$'s.

$$M_{a,t} = \max_{0 \leq i \leq d-1} |C_i|$$

This gives the largest number of times any one device is accessed during a stride access to the d addresses $a, a+t, a+2t, \ldots, a+(d-1)t$. At least, with conflict-free access, the nonuniformity is 1; at most, it is d. For any power-of-two stride accesses, using a permutation satisfying condition (A), the nonuniformity is either 1 or 2.

The nonuniformity of these functions has been measured for various starting addresses a and stride t, assuming a system of 512 memory modules, and using the $9 \times 29$ matrix as defined in Table 2. In such a system, if the randomization function is used to provide the device numbers, the nonuniformity would be about 5.16, a value which has been included in the graphs of FIGS. 6, 7 and 8 for comparison. "Straight" interleaving has also been included to illustrate the inadequacy of such memory organization. The nonuniformity $Ma_{i,t}$ associated with starting address a, and stride t was calculated for each stride using 10,000 different randomly generated starting addresses $a_i$'s. The average of $Ma_{i,t}$'s over all i's are plotted against the stride t.

Figure 6:
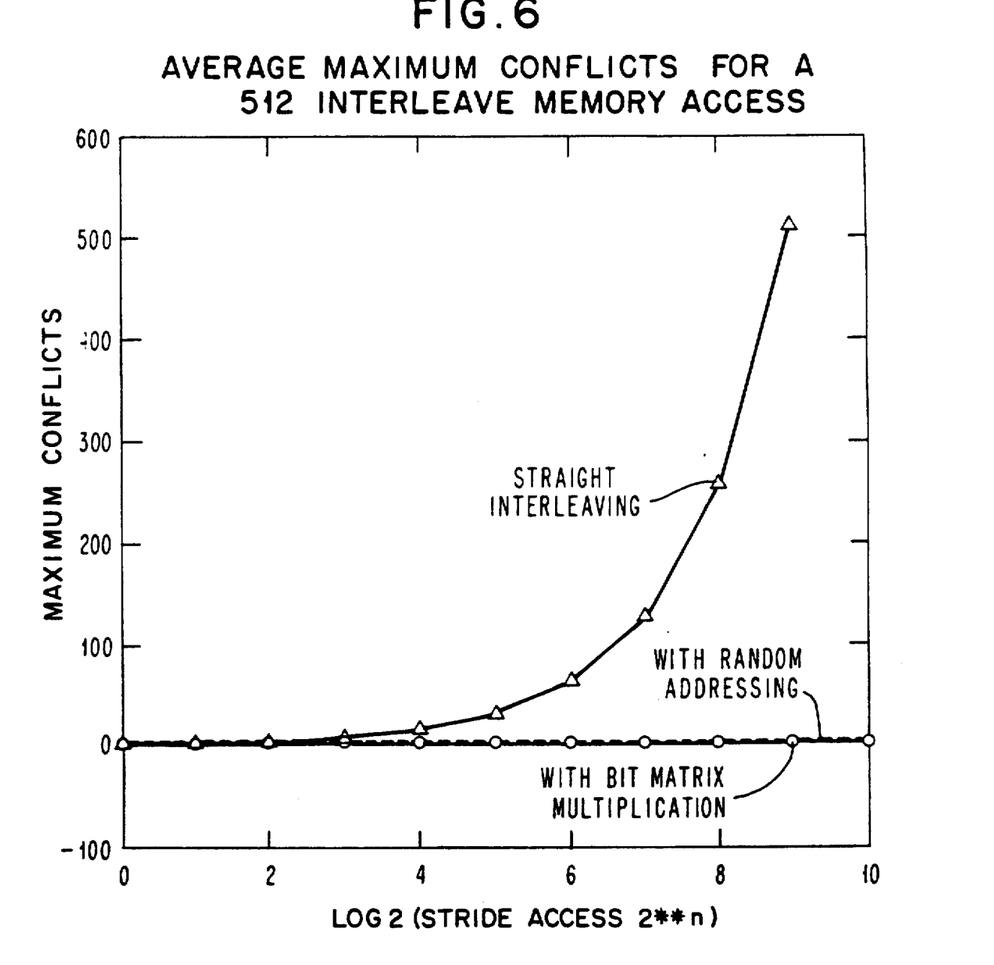
FIG. 6 is a graph comparing the three different methods of interleaving: the matrix multiplication method as set forth in this invention, a straight interleaving without hashing, and a pure random function. The graph is plotted with $\log_2$ of stride as the x-axis, and the maximum number of collisions (i.e., maximum of total accesses to each memory module) as the y-axis. The stride accesses used in the illustrated experiment are in various powers of two.

To illustrate the effectiveness of the technique, all power-of-two stride accesses from $2^0$ to $2^{10}$ were measured. As expected, all $A_{2j}$'s are less than or equal to 2. The graph in FIG. 6 shows the bit-matrix-multiply method as compared with pure interleaving and with randomization of device numbers.

Figure 7:
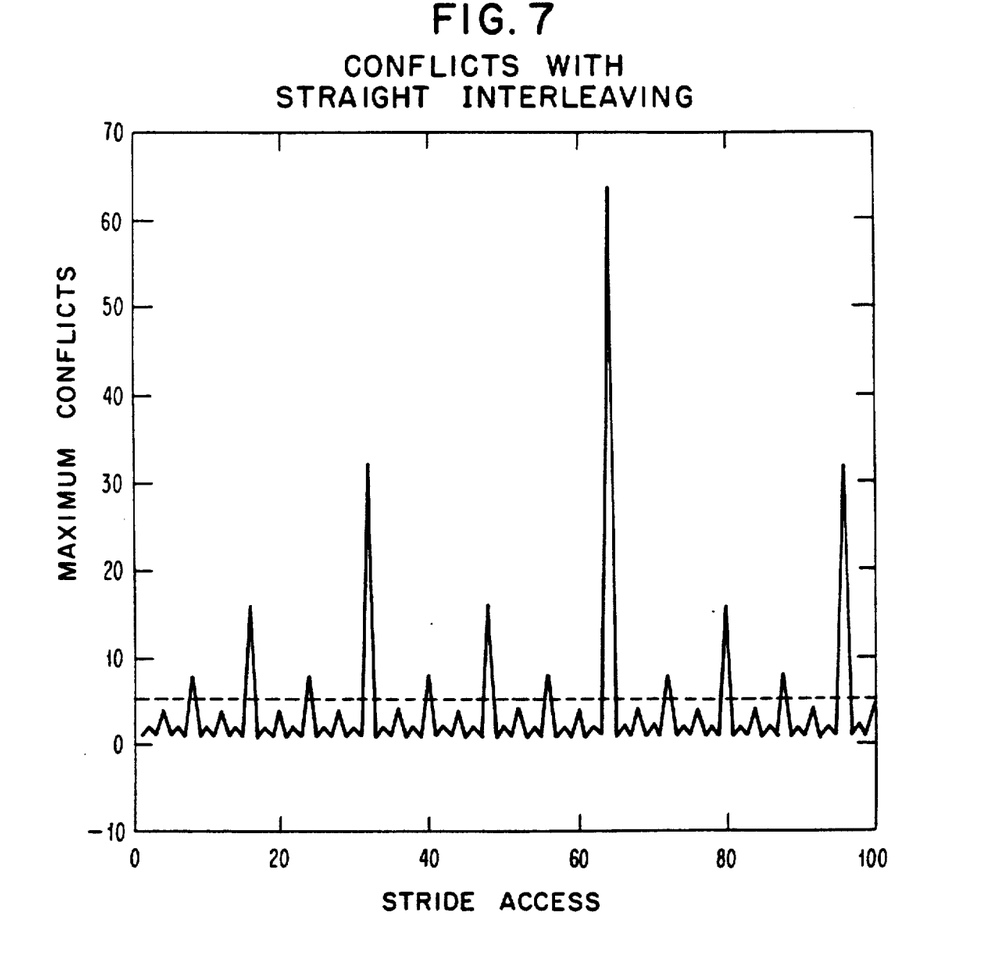
FIG. 7 is a graph comparing the straight interleaving method and the same pure random function as used for FIG. 6. The graph is plotted with stride as the x-axis, and the maximum number of collisions (i.e., maximum of total accesses to each memory module) as the y-axis. The stride accesses used in this experiment are from 1 to 100.
Figure 8:
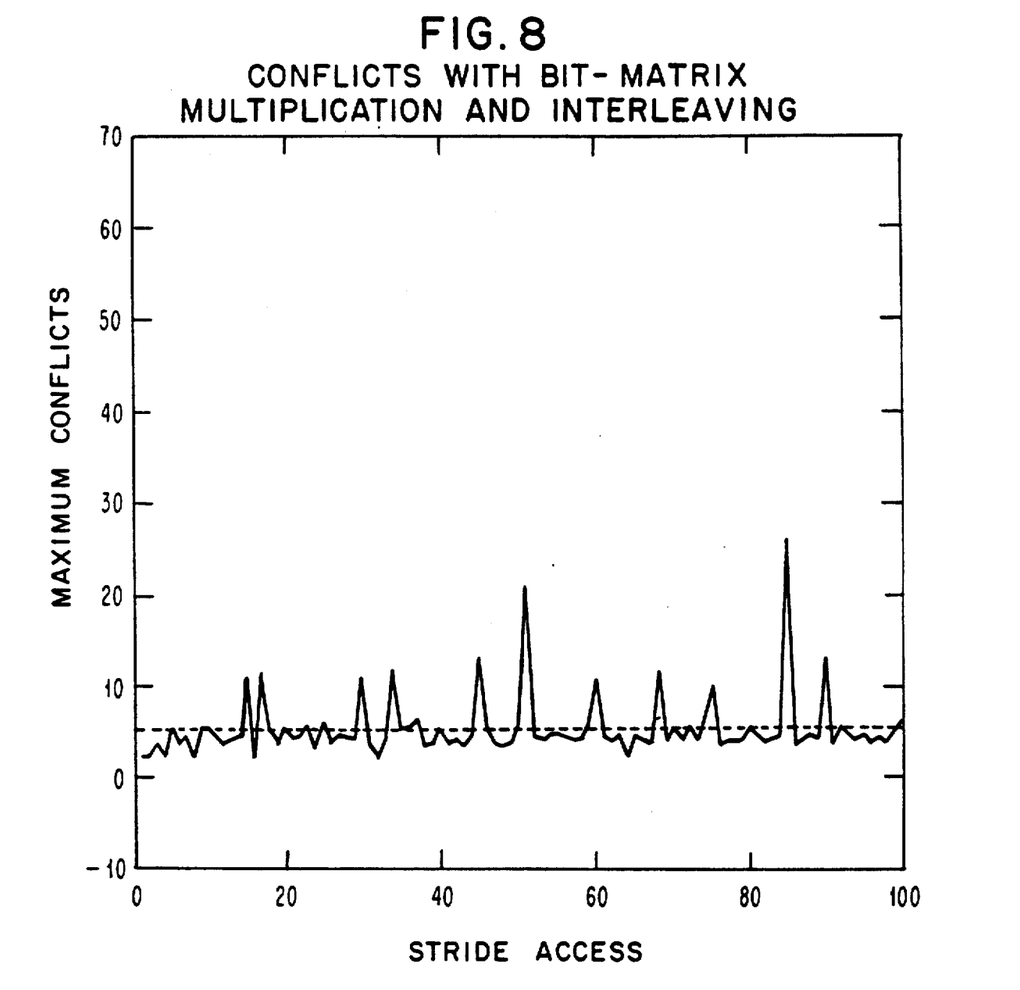
FIG. 8 is a graph comparing the matrix multiplication method as set forth in this invention, and the same pure random function as used for FIG. 6. The graph is plotted with stride as the x-axis, and the maximum number of collisions (i.e. maximum of total accesses to each memory module) as the y-axis. The stride accesses used in this experiment are from 1 to 100.

Similar samples were collected for strides from 1 to 100. Graphs in FIG. 8 and FIG. 7 give a comparison of the general behavior of the bit-matrix multiply method with "straight" interleaving. The behavior of the method demonstrates that it performs "closer" to that of a random function than the "straight" interleaving for most non-power-of-two strides.

Hardware Implementation

The previously described results of tests utilizing the present invention to reduce potential conflicts related to stride and the like were obtained using software simulation of the described mapping procedure. And it should be understood that such a software implementation is both practical and feasible. However, in a large memory system where overall time of access to memory is critical, it will be evident to those skilled in the art that a hardware embodiment will be capable of operating at significantly greater speed. Accordingly, the following is a detailed description of a preferred hardware embodiment of the invention together with a brief discussion of certain features of the invention which uniquely contribute to a possible design of an address permutation unit incorporating the present invention features wherein the bit-matrix multiplier used for the address mapping utilizes a minimum number of devices and circuit levels, both of which contribute significantly to the speed of operation.

Given a Boolean matrix M, and a logical address vector V, the logical depth of the process of Boolean bit-matrix multiply is logarithmic in the number of columns s of the matrix. All elements in the product vector can be computed in parallel. Each element of the product vector is the exclusive-or of those elements of V for which the corresponding element of M is 1. This can be computed in hardware by first computing the AND of each element of V with the corresponding element of M, then combining the s results in a binary tree of exclusive-or's. The result is in fact the parity of the bitwise AND of the row of M and the vector V.

Because of the straight forward nature of the functions required of the hardware implementation of the present invention, it is possible to implement the Boolean matrix multiply as part of the address translation hardware within the individual processing elements of the large parallel processing system. The choice or design of the matrix can be an attribute of a page or segment of virtual memory. In the Research Parallel Processing System (RP3) [12] referenced previously all interleaved memory is designed, by default, to undergo such a transformation.

The design of a suitable hardware implementation having the above features is set forth in the figures. This embodiment is designed strictly for address transformation and more particularly to solve the problems normally attendant with power-of-two stride accesses in such a system. As stated previously, a hardware system having a more general capability of utilizing the concept of address or other data permutations via bit-matrix multiplication is set forth in the previously referenced U.S. patent application No. 114,795, now abandoned.

Figure 1:
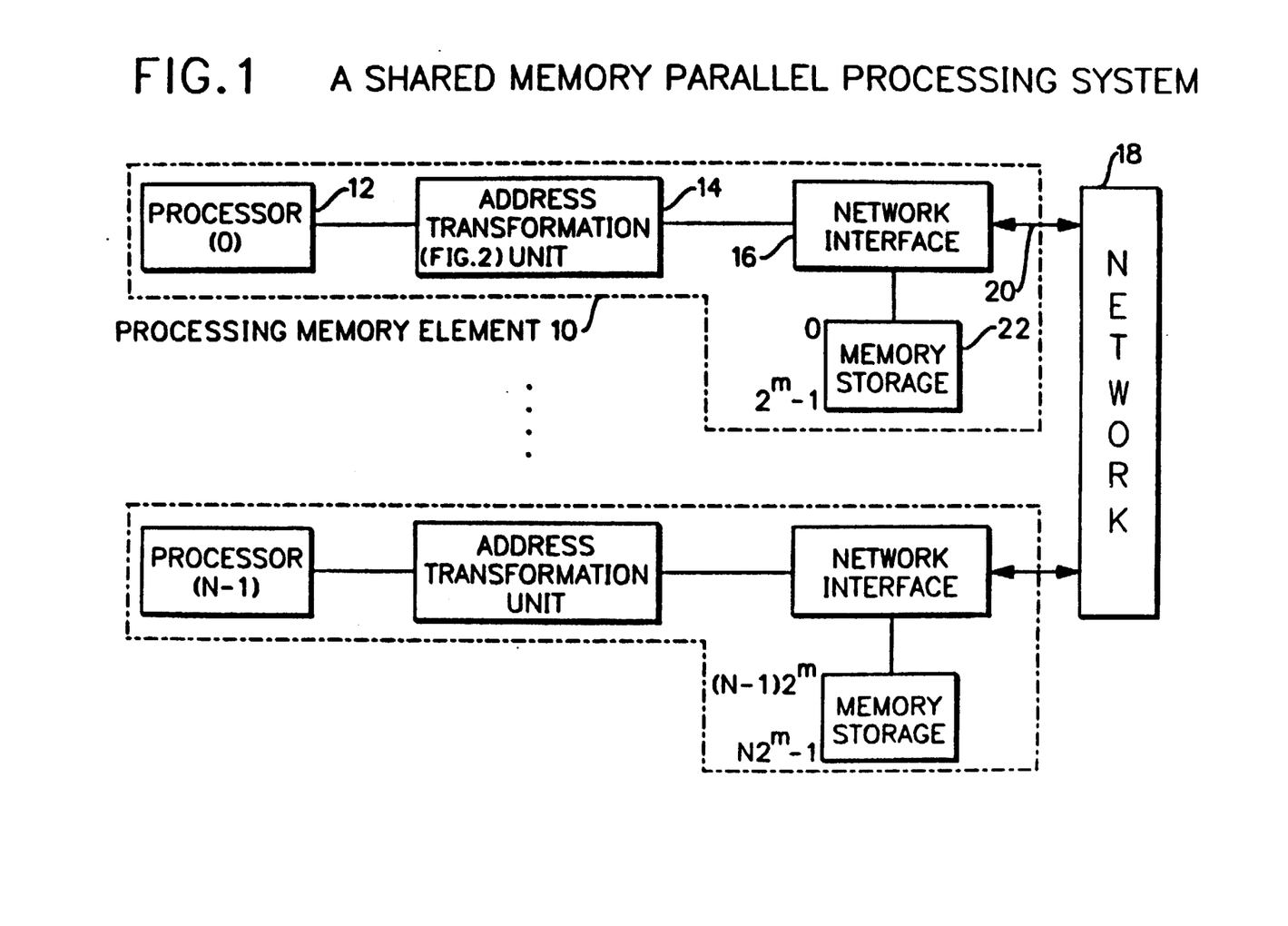
FIG. 1 comprises a functional block diagram of a highly parallel processing system having a shared memory. Each processor has associated with it a memory module which is accessible by all other processors via a multistage interconnection network.

FIG. 1 comprises a high level functional block diagram of a highly parallel processing shared memory system such as the previously referenced RP3 [12]. The system comprises a plurality (up to 512) Processing Memory Elements 10 interconnected via a network 18. Each processing Processing Memory Element (PME) is envisioned as being substantially identical and comprises a micro-processor 12, an address transformation unit 14, a network interface 16, and a memory storage unit 22. The microprocessor 12 functions in a normal manner and when necessary accesses system memory for instructions and/or data. The address transformation unit 14 transforms logical addresses from the processor into physical addresses and memory. The network interface 16 determines whether a particular physical address resides in local memory 22 or must be accessed from another memory element 22 of the overall shared memory system resident in another PME. Access to another memory unit 22 in another PME would be via the network 18. As will be remembered the RP3 is a tightly coupled multi-processor system in which memory is shared and is available to all processors. Further in the RP3, in addition to being shared, each of the memory storage units 22 is locally adjacent a particular processor.

Figure 2:
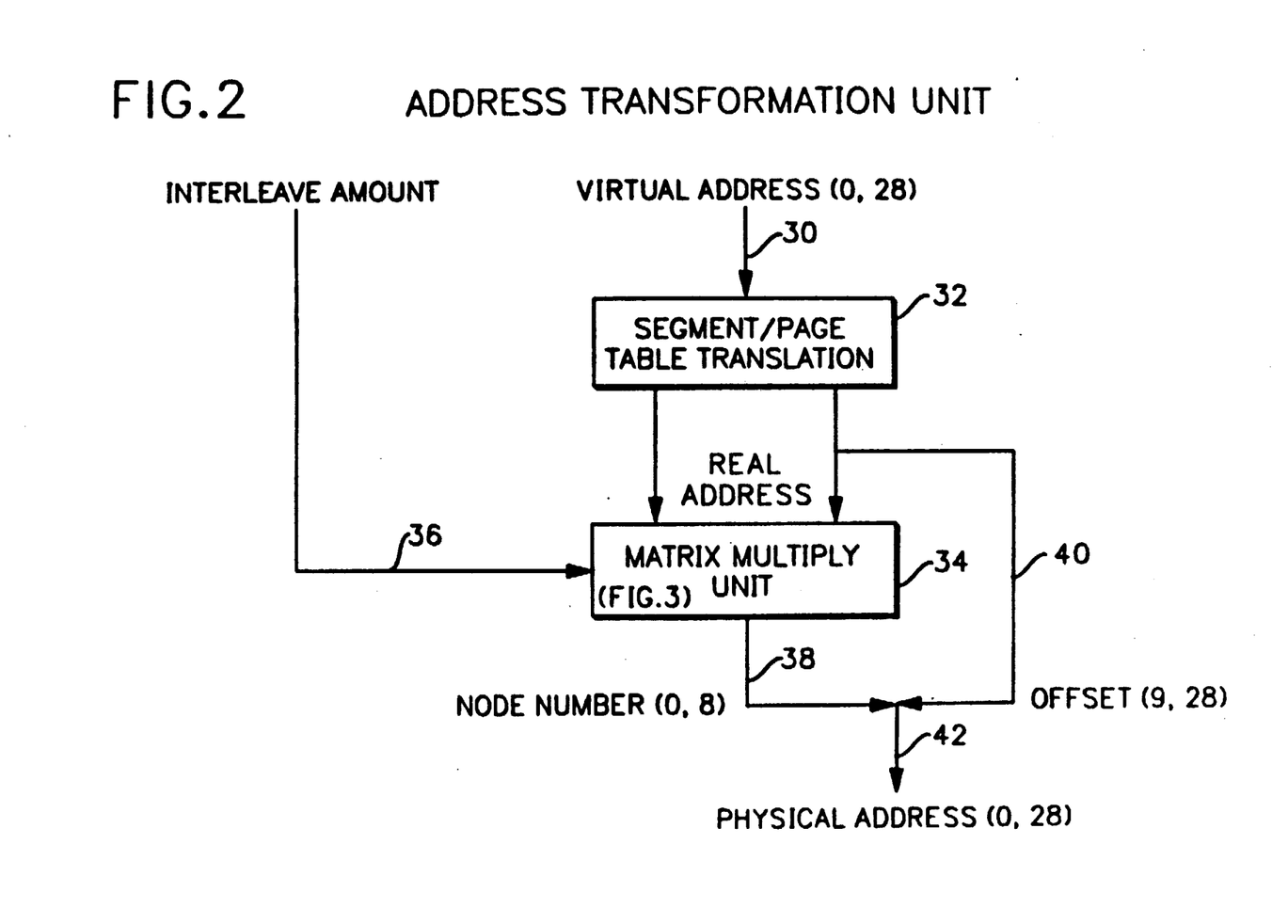
FIG. 2 is a functional block diagram of an address transformation unit embodying the principals of the present invention which could be utilized in the system of FIG. 1.

The details of the present invention are resident in the address transformation unit 14. A functional block diagram and data flow for this unit are shown in FIG. 2. As indicated in the figure, a 29 bit virtual address (0,28) is placed on input line 30 to the segment/page table translation unit 32. As is well known in such virtual addressing systems, the virtual address is translated into the real address via a page and segment table look-up in unit 32 as in any conventional virtual memory system. The result is a real address on line 34 in which bits 9 through 28 comprise an offset and bits 0 through 8 indicate in which segment and page the requested real address is resident. It is bits 0 through 8 which must pass through the address transformation operation via the matrix multiply unit 34. It will of course be remembered that although bits 9 through 28 form the offset portion of the physical address appearing on line 36, these bits must also be supplied as part of the input to the matrix multiply unit 34. Bits 0 through 8 must be permuted into a node number by the matrix multiply unit which, stated differently, specifies into which memory of the overall system the particular address resides. Again, it is assumed that the system contains 512 different PME's and associated separate memory storage units 22. Accordingly, 9 bits (0,8) are required to specify such a node address. The actual number of its bits used, for determining the node address and the number of offset bits depend on the interleave amount specified for a particular system configuration. Thus, if a particular system only comprised, for example, 256 PME's, then only 8 bits would be needed to specify the node number and accordingly only 8 bits would be produced by the matrix multiply unit 34. These specific interleave amounts would appear on line 36 in the figure and would control (not specifically shown) how many bits of permuted output were produced.

The actual permutation matrix is assumed to be stored and/or available to the matrix multiply unit 34 which could simply be a ROM within the matrix multiply unit.

Figure 3:
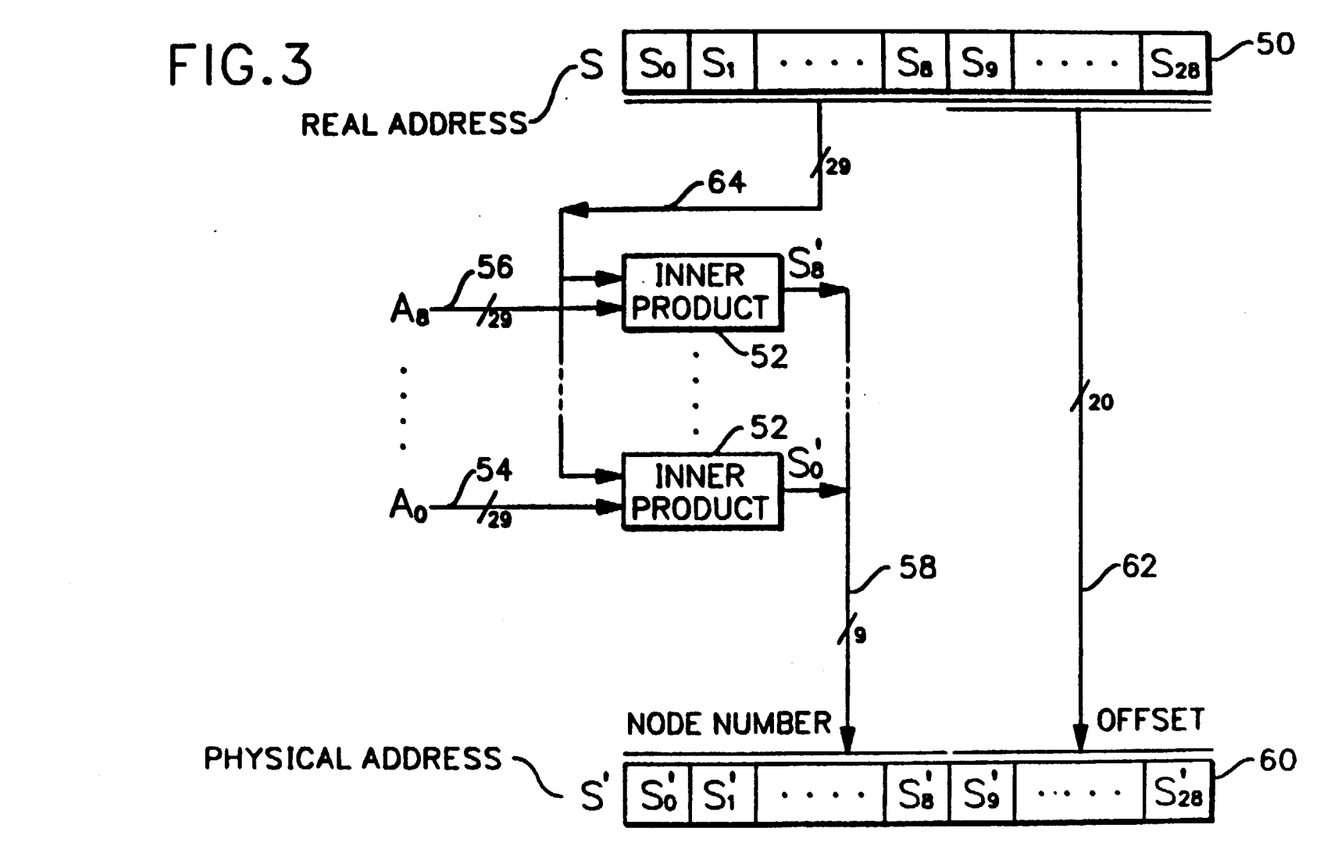
FIG. 3 comprises a functional block diagram of suitable hardware for performing the bit-matrix multiplication of the present invention whereby physical memory addresses are derived from an initial logical address utilizing the permutation procedure of the present invention.

Assuming that 9 bits of permuted address were to be produced by the system, it will be understood that the entire 29 bit real address would be successively multiplied (9 times) with the first nine 29 bit rows of the permutation matrix, thus producing a 9 bit node address on line 38. This 9 bit node number or address would be combined with bits 9 through 28 on line 40 to produce the 29 bit physical address on line 42. FIG. 3 illustrates one possible hardware implementation of a matrix multiply unit which would be capable of providing the permuted address as required by the herein disclosed method.

The 29 bits of the real address S and the 29 bits from each respective row of the matrix A is shown in Table 2 and form the inputs into this inner-product functional unit. The real address S is stored in register 50 and the nine 29 bit rows ($A_0 \ldots A_8$) are supplied to the inner-product blocks 52 via the two lines 54 and 56 illustrated in the figure. It will of course be understood that assuming that a 9 bit permutation were to occur, that there would be nine 29 bit input lines like 54 and 56 each providing one 29 bit input to 9 of the inner-product block 52. As described previously, each of the inner-product blocks 52 produces a respective bit of the final node number appearing on line 58. As will be noted in the figure, as described previously with respect to FIG. 2, bits $S_9$' through $S_{28}$' of the real address are transmitted directly in unaltered form to bit storage locations $S'_9$ through $S'_{28}$ in the output register 60 via lines 62.

All 29 real address bits $S_0$ through $S_{28}$ must also be supplied to each input of the inner-product blocks 52 via line 64 as illustrated. Plus each inner-product block 52 receives 29 bits of real address and also a 29 bit row from the matrix. Thus, each inner-product block 52 performs the required matrix multiplication to produce a single output bit ($S'_x$).

Figure 4:
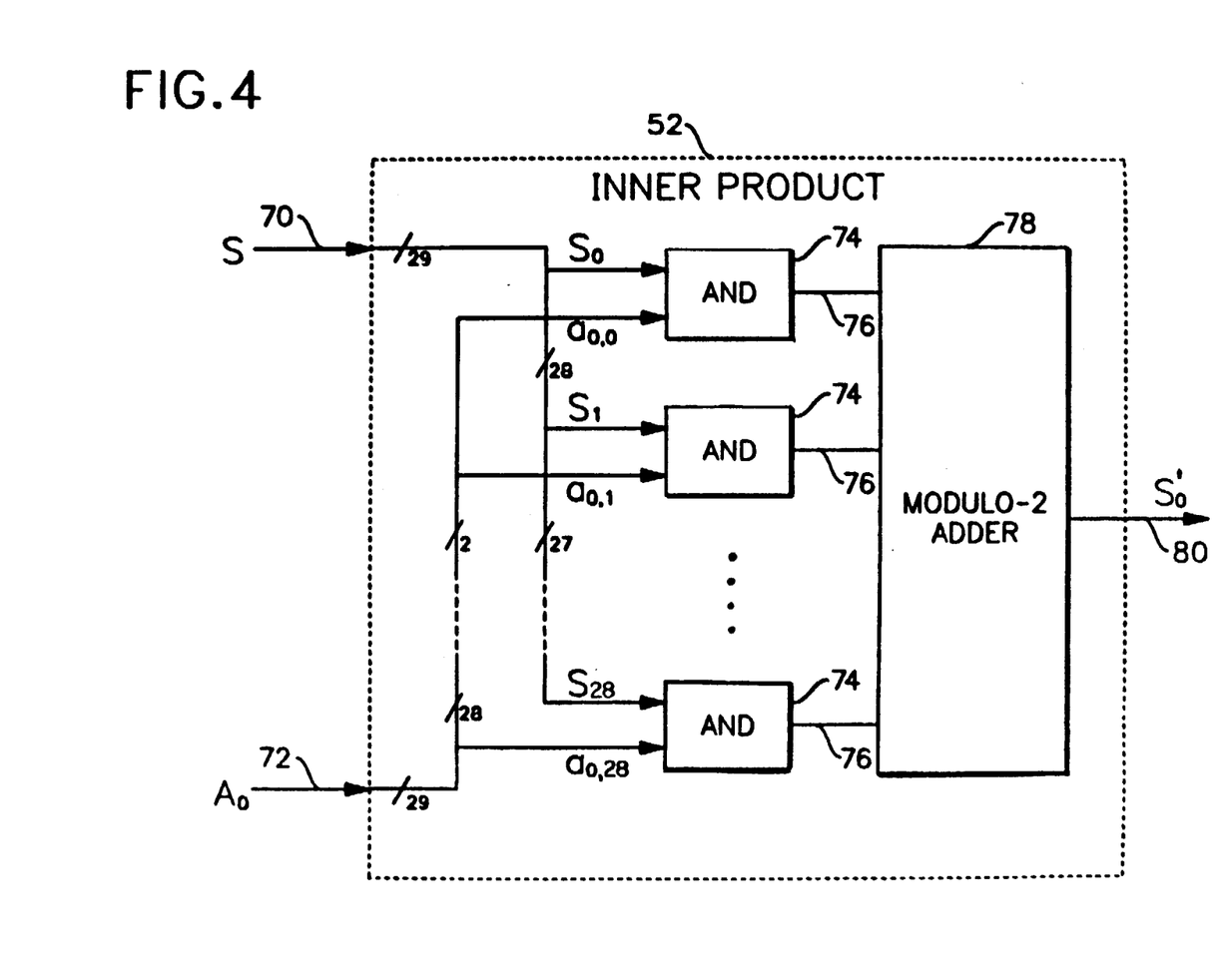
FIG. 4 comprises a logical block diagram of an inner-product block such as shown in FIG. 3.

FIG. 4 comprises a detailed logical schematic diagram of how an inner-product block 52, as shown in FIG. 3, could be embodied. The figure illustrates specifically the circuitry for generating the most significant bit $S'_0$ using as inputs:

1. the 29 bit real address $S_{(0,28)}$ supplied to the block on line 70 and
2. the 29 bit row 0 of the matrix A supplied to the block on line 72. The address and row bits are supplied to 29 and circuits 74 wherein bits $S_0$ and $A_0$ are supplied to the upper AND gate and bits $S_{28}$ and $A_{28}$ are supplied to the lower AND gate. All 29 outputs appearing on the lines 76 form the inputs to a modulo-2 adder 78 which combines these 29 inputs into a single output bit via a logical modulo-2 addition function. This could be performed by an 'exclusive-or' tree as will be understood by those skilled in the art. It will of course be understood that the inner-product function may be performed by a number of different logical circuit configurations. A different configuration is utilized in the related copending application Ser. No. 114,795, now abandoned.

This completes the description of the disclosed preferred hardware embodiment which is capable of performing the overall bit matrix multiplication permutation procedure of the present invention. Other configurations could be readily designed signed by those skilled in the art.

FIG. 5 illustrates an inverted baseline network which is typical of the type of interconnection network used in such highly parallel shared memory systems. The configuration of this network allows a conflict free data routing for all power-of-two stride accesses if and only if such addresses were permuted in accordance with the present invention prior to routing. This system forms no part of the present invention and is shown for illustrative purposes only. As will be apparent to those skilled in the art, it is a multi-stage, two-sided blocking network. Very briefly, the operation is as follows. The three columns of switches, marked A, B, C will connect either of the two inputs to a particular output depending upon the setting of the address subfield. In this case, the upper output of each switch would be active if the field were 0 and the bottom output would be active if the address or subfield were a 1. The column of the binary numbers to the left represent source or user addresses and the column of three bit binary numbers at the right represents destination or server addresses. It will be noted that the same number appearing in the same row of both columns indicates that the source is also the destination or server. Thus in the figure, if the source 000 wishes to utilize its own memory it would provide a destination address of 000. As will be understood this results in the upper switches in all three columns being selected to their upper outputs because of the destination address 000 being given to the switch control matrix. Again, examining the figure it will be noticed that the small subfields a, b, and c in the figure designate the particular subfields which controls the switch columns A, B, and C. Thus, if it were desired to connect source 011 to destination 111, the address 111 would be given by the source 011 which would cause the lower outputs of the three switches 90, 92, and 94 to be actuated which would effect this connection.

As a second example, suppose it were desired to connect source 001 to destination 110, in this case the address or matrix switch command 110 would be presented to the switch control matrix for the network by source 001 which would cause the lower outputs of switch blocks 96 and 92 to be active and the upper output of block 94 to be active which would effect the desired routing. Thus, any desired interconnection between source and destination may be effectuated by the system. As stated previously, of course, switch contention or the passage of two requests through the same switch at the same time, will be alleviated only by utilizing the herein described address permutation procedure.

Conclusions

Having completed the description of the herein described procedure for improving power-of-two stride accesses to physical devices, certain conclusions may be reached. This method is of particular value in avoiding memory or I/O hot spots which would result when many processors reference data separated in addresses by powers of two. Network contention as well can be avoided by an appropriate choice of the mapping function. It has been shown for example that all contention in an inverted baseline network can be avoided for all power-of-two stride accesses. The method does not totally eliminate contention of other stride accesses, however such contention is comparable to the contention associated with random memory references.

A significant advantage of this procedure lies in the fact that it can be readily implemented in a small number of exclusive-or gates. Therefore the method is appropriate for application in the memory addressing hardware of general-purpose parallel computers. Because of the complete elimination of power-of-two stride access conflicts, it is also appropriate to implement this method in special-purpose and SIMD machines that rely on conflict-free access to parallel memory at power-of-two intervals.

The specific examples of the use of the invention described herein provide only a limited number of applications for this procedure. It is believed that use of the present invention will yield improved access methods for a variety of network topologies, and will be useful in I/O system designs.

While a hardware implementation of the procedure has been disclosed as the preferred embodiment of the invention, it should be clearly understood that it is possible to easily implement the invention in software as described previously. In summary, the present invention resides in the novel procedure for obtaining the address permutation involving the bit-matrix multiplication procedure and not in its particular mode of implementation.

The value and simplicity of the procedure clearly indicates that the presently disclosed bit-matrix multiplication should be included in memory mapping hardware for processors in highly parallel systems.

Having thus described our invention, what we claim as new and desire to secure by Letters Patent is:

1. An aperiodic mapping system for the mapping of logical addresses to physical addresses in a multi-user, multi-server system wherein there are $2^d$ server devices and n logical address bits (where d is $<n$) for generating optimized stride accesses among said multiple server system;

said multiple-users and multiple servers being selectively connectable over an interconnection network wherein any user can communicate with any server in the system, each user having its own address transformation unit including a multiplier means and a matrix storage means, each said network having addressing means which examines any system address on the network to determine which server is being addressed, said mapping system comprising, an address transformation means operating in each address transformation unit for performing in the multiplier a bit-matrix multiplication of an n-bit first (logical) address (A) from its associated user with a predetermined matrix M' stored in the matrix storage means, said matrix having d, n-bit rows to produce a second (d-bit)+(n−d bit) (physical) address A', placing said second address A', on the interconnection network, and utilizing the d-bits of said second address A' to determine if that server is being addressed.

2. Said aperiodic mapping system as set forth in claim 1 including each addressing means utilizing the n−d bits of the address A which were not altered by the mapping procedure as an address offset within the addressed server device.

3. Said aperiodic mapping system as set forth in claim 1 wherein said matrix M' comprises the first d rows and n columns of a square n×n matrix M, including configuring said matrix M' so that all d×d submatrices consisting of d consecutive columns of M' are nonsingular and wherein a matrix is defined as nonsingular if and only if its determinant is nonzero or the matrix is invertible.

4. Said aperiodic mapping system as set forth in claim 3 including configuring said matrix M as an n by n matrix so that either the top or bottom row of said matrix is all '1's (unitary) and that either the right or left hand columns is all '1's, the remainder of the matrix being configured so that all bits are the exclusive-OR at the two adjacent bits closest to the unitary column and row.

5. A method for mapping addresses from a first to a second address for improved system performance in a multi-processor computer system having a plurality of memory modules wherein both the processors and memory modules are adapted for concurrent operation, said processor and memory modules being selectively connectable over an interconnection network each processor having an address transformation unit including a multiplier and a matrix storage means, said system including address responsive means for accessing a desired memory module and further address responsive means for accessing a selected offset with a selected memory module, said system further having a physical address architecture comprising n address bits and $2^d$ separately accessible memory modules where d is <n) and an address format $A = (a_0, a_1, \ldots a_{n-2}, a_{n-1})$, said mapping method comprising:

a) said processor transmitting a first n bit address to its address transformation unit b) accessing a predetermined permutation matrix M' having d rows and n columns from said matrix storage means c) said multiplier accessing d successive n bit rows of said matrix and performing d bit-matrix multiplications with the n bits of said first address to produce d successive second address bits, and d) said system address responsive means utilizing the generated d bits of the second address as a memory module address in the system memory.

6. Said aperiodic mapping method as set forth in claim 5 wherein there are d memory modules and n logical address bits where (where d is <n), addressing means within an addressed memory module utilizing the n−d bits of the first address which are not altered by the mapping procedure as an address offset within the addressed memory module.

7. Said aperiodic mapping method as set forth in claim 5 wherein said matrix M' comprises the first d rows and n columns of a square n×n matrix M including said matrix M' being configured so that all d×d submatrices consisting of d consecutive columns of M' are nonsingular, wherein said matrix is defined as nonsingular if and only if its determinant is nonzero or the matrix is invertible.

8. Said aperiodic mapping method as set forth in claim 7 wherein said n by n matrix M is so configured that either the top or bottom row of said matrix is all '1's (unitary) and that either the right or left hand columns is all '1's, the remainder of the matrix being configured so that all bits are the exclusive-OR of the two adjacent bits closest to the unitary column and row.

* * * * *